(12) United States Patent
Walters et al.

(10) Patent No.: US 11,816,242 B2
(45) Date of Patent: Nov. 14, 2023

(54) LOG COMPRESSION AND OBFUSCATION USING EMBEDDINGS

(71) Applicant: Capital One Services, LLC, McLean, VA (US)

(72) Inventors: Austin Walters, Savoy, IL (US); Jeremy Goodsitt, Champaign, IL (US); Grant Eden, Menlo Park, CA (US)

(73) Assignee: Capital One Services, LLC, McLean, VA (US)

( * ) Notice: Subject to any disclaimer, the term of this patent is extended or adjusted under 35 U.S.C. 154(b) by 145 days.

(21) Appl. No.: 17/305,760

(22) Filed: Jul. 14, 2021

(65) Prior Publication Data

US 2023/0017165 A1 Jan. 19, 2023

(51) Int. Cl.
*G06F 21/62* (2013.01)
*G06N 3/08* (2023.01)
*G06F 18/214* (2023.01)

(52) U.S. Cl.
CPC ........ *G06F 21/6245* (2013.01); *G06F 18/214* (2023.01); *G06F 21/6227* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2015/0186501 A1* | 7/2015 | Baluja | G06F 16/24578 707/750 |
| 2020/0394186 A1* | 12/2020 | Domeniconi | G06F 40/205 |
| 2021/0125615 A1* | 4/2021 | Medalion | G10L 15/26 |
| 2021/0149905 A1* | 5/2021 | Luo | G06F 16/24549 |

FOREIGN PATENT DOCUMENTS

| | | | | |
|---|---|---|---|---|
| KR | 20140095821 A | * | 8/2014 | ........... G06F 21/608 |
| WO | WO-2006088507 A1 | * | 8/2006 | ....... G06F 17/30902 |
| WO | WO-2022157751 A1 | * | 7/2022 | |

* cited by examiner

*Primary Examiner* — Alexander Lagor
*Assistant Examiner* — Felicia Farrow
(74) *Attorney, Agent, or Firm* — Harrity & Harrity, LLP

(57) ABSTRACT

In some implementations, a device may train the model to generate embeddings for log files associated with an application, and to enable the model to generate embeddings for sensitive information included in a set of training log files. The device may receive a log file associated with the application. The device may generate a compressed log file including a set of embedding vectors associated with records included in the log file, where a record that includes sensitive information is associated with one or more embedding vectors for the sensitive information and one or more embedding vectors for other information included in the record. The device may store the compressed log file including the set of embedding vectors where a size of the compressed file is less than a size of the log file, and the embedding vectors obfuscate the records included in the log file.

20 Claims, 7 Drawing Sheets

LOG COMPRESSION AND OBFUSCATION USING EMBEDDINGS

BACKGROUND

Data compression involves encoding information using fewer bits than the original representation of the information. Compression can be either lossless or lossy. Lossless compression reduces bits by identifying and eliminating statistical redundancy such that no information is lost in lossless compression. Lossy compression reduces bits by removing unnecessary or less important information.

SUMMARY

In some implementations, a system for compressing and obfuscating log files using a neural network model to generate embeddings for the log files includes one or more memories and one or more processors, coupled to the one or more memories, configured to: train the neural network model, using a set of training log files associated with a log creation application, to generate embeddings for log files associated with the log creation application, wherein training the neural network model enables the neural network model to generate embeddings for uncommon information included in the set of training log files; receive, by an encoder associated with the neural network model, a log file associated with the log creation application; generate, by the encoder, a compressed log file including a set of embedding vectors associated with records included in the log file, wherein a record that includes uncommon information is associated with one or more embedding vectors for the uncommon information and one or more embedding vectors for other information included in the record; and store the compressed log file including the set of embedding vectors associated with the log file, wherein a size of the compressed file is less than a size of the log file, and wherein the embedding vectors obfuscate the records included in the log file.

In some implementations, a method for compressing and obfuscating log files using a model to generate embeddings for the log files includes training, by a device, the model, using a set of training log files associated with an application, to generate embeddings for log files associated with the application, wherein training the model enables the model to generate embeddings for sensitive information included in the set of training log files; receiving, by the device, a log file associated with the application; generating, by the device using an encoder associated with the model, a compressed log file including a set of embedding vectors associated with records included in the log file, wherein a record that includes sensitive information is associated with one or more embedding vectors for the sensitive information and one or more embedding vectors for other information included in the record; and storing, by the device, the compressed log file including the set of embedding vectors associated with the log file, wherein a size of the compressed file is less than a size of the log file, and wherein the embedding vectors obfuscate the records included in the log file.

In some implementations, a non-transitory computer-readable medium storing a set of instructions includes one or more instructions that, when executed by one or more processors of a system, cause the system to: train a neural network model, using a set of training log files associated with a log creation application, to generate embeddings for log files associated with the log creation application, wherein training the neural network model enables the neural network model to generate embeddings for uncommon information included in the set of training log files; receive a log file associated with the log creation application; generate, using an encoder associated with the neural network model, a compressed log file including a set of embedding vectors associated with records included in the log file, wherein a record that includes uncommon information is associated with one or more embedding vectors for the uncommon information and one or more embedding vectors for other information included in the record; and store the compressed log file including the set of embedding vectors associated with the log file.

DETAILED DESCRIPTION

Figure 1A:
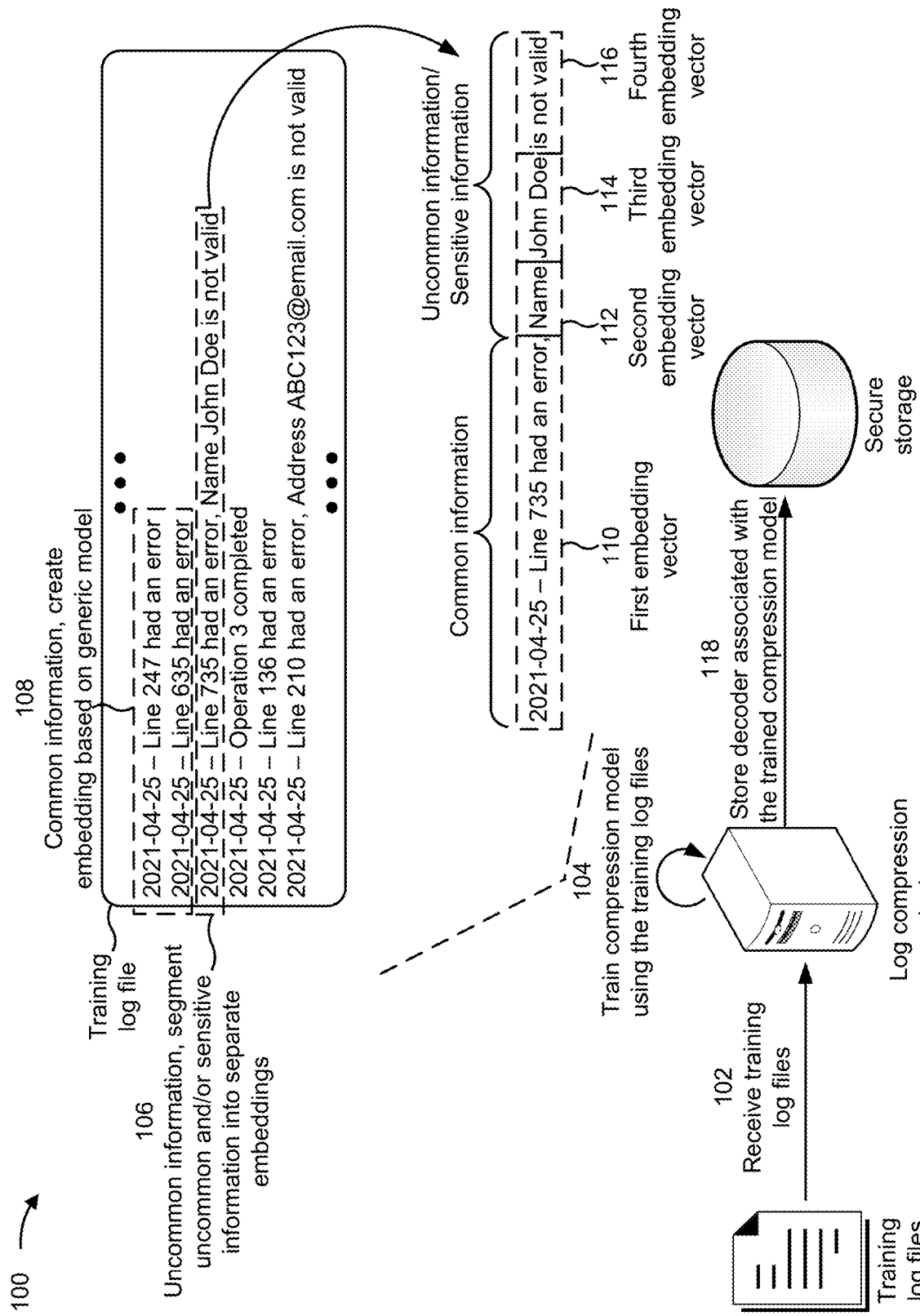
FIGS. 1A-1D are diagrams of an example implementation relating to log compression and obfuscation using embeddings.

The following detailed description of example implementations refers to the accompanying drawings. The same reference numbers in different drawings may identify the same or similar elements.

A device may execute one or more processes and/or one or more applications to enable the device to perform actions. In some cases, a process and/or application executed by the device may generate data associated with the actions performed by the device. As used herein, a device that generates data may be referred to as a source device and/or an application server. In some cases, a source device (and/or an application executing on the device) may generate a log associated with an action or operation performed by the source device. A log may include data associated with events that have occurred associated with an application executing on the source device. For example, a log may identify one or more scripts, queries, operations, jobs, and/or other information designed to provide information regarding the status of data processing jobs. In some cases, the source device may transmit log data to another device (e.g., a destination device) to enable the other device to analyze, store, and/or compile log data from multiple source devices.

Log data may provide insight for an entity related to activity on a system or network of the entity. For example, log data may enable an institution to analyze errors associated with the system or network, to recognize unusual activity on the system or network, to scan for vulnerabilities of the system or network, and/or to detect malicious actors on the system or network, among other examples. Therefore, log data may enable the institution to act on security events (e.g., security attacks or malicious actors identified on the system or network) when necessary, thereby improving the security of the system or network. However, storing log data may consume significant memory resources. For example, an institution may generate hundreds, thousands, millions, or more logs (e.g., that include log data) daily, weekly, and/or monthly. The generated logs need to be stored to enable the log data to be analyzed by systems and/or users to realize the benefits described above. As a result, log data creates a significant memory and storage overhead for institutions.

Moreover, in some cases, the source device may generate log data that includes sensitive information. "Sensitive information" may refer to information that is confidential, secret, personal, and/or otherwise protected. The source device may not detect that the log data includes sensitive information and may share the log data with a destination device. As a result, the source device may inadvertently make an unauthorized disclosure of the sensitive information (e.g., that is identified in the log data) by transmitting the log data to the destination device that is outside of an environment associated with the source device and/or that is associated with a different entity than an entity associated with the source device. Such unauthorized disclosures of sensitive information may result in legal liability and/or financial liability for the entity associated with the source device.

In some cases, log data may be compressed using a data compression technique. The data compression technique may reduce a size of the log data to reduce an amount of memory used to store the log data. However, data compression techniques used for log data may be unable to recognize and/or compress sensitive or uncommon information included in the log data. For example, log data typically includes information, words, and/or phrases that are used frequently in the log data. Logs are generated using phrases or words to identify actions or errors within a system or network, such as "line 257 of the executed code had an error." The data compression technique may be trained or programmed to effectively compresses the typical or common information included in the log data. However, the data compression technique may be unable to recognize and/or compress sensitive or uncommon information included in the log data (and/or may treat the sensitive or uncommon information the same as the typical or common information included in the log data). Moreover, the compressed log data may be decompressed using a standard library or decompression code (e.g., that may be readily available to many users). As a result, a malicious actor may be enabled to obtain sensitive information included in the log data based on the data compression technique being unable to recognize and/or compress sensitive or uncommon information included in the log data (and/or based on the data compression technique treating the sensitive or uncommon information the same as the typical or common information included in the log data). Therefore, compressing the log data using such data compression techniques introduces a risk of an unauthorized disclosure of sensitive information included in the log data.

Some techniques and implementations described herein enable log compression and obfuscation using embeddings. For example, a model (e.g., a neural network model) may compress log data into an embedding space. The model may be trained to compress generic or typical information (e.g., common information) for log data. The model may be deployed for a particular source device and/or a particular application. The model may be trained using a training data set of logs associated with the particular source device and/or the particular application. For example, the model may be trained to recognize and/or compress uncommon information and/or sensitive information included in the training data set of logs associated with the particular source device and/or the particular application. The trained model may be deployed to compress log data generated by the particular source device and/or the particular application. The model by be trained using an autoencoder, such as a variational autoencoder, among other examples.

For example, the model may be trained to parse log data to segment common information included in the log data from uncommon information included in the log data. In other words, the model may cluster common information and uncommon information when compressing the log data. The model may generate an embedding vector for sensitive and/or uncommon information included in the log data. Moreover, because the model has been trained for the particular source device and/or the particular application, the compressed log data may not be decompressed by a generic or readily available decoder or decompression technique. This improves security of the log data by ensuring that uncommon and/or sensitive information included in the log data is obfuscated (e.g., by generating an embedding vector for the uncommon and/or sensitive information) and by ensuring that a malicious actor cannot easily decode and/or decompress the log data to obtain the uncommon and/or sensitive information.

Additionally, some techniques and implementations described herein enable improved searching of compressed log data. For example, the model may compress the log data into an embedding space by creating embedding vectors for data included in the log data. As described in more detail elsewhere herein, the model may create separate embedding vectors for each word and/or phrase included in the log data that is associated with uncommon and/or sensitive information. Therefore, a device (e.g., executing the model) may receive a search term associated with uncommon and/or sensitive information (e.g., the search term may be for "password" or "name" or may be for a particular name or user identifier). The device may generate an embedding vector (e.g., using the trained model) for the search term. The device may search stored compressed log data using the generated embedding vector to identify any matching logs that include the embedding vector. The device may return any matching logs to enable logs that include the search term (e.g., associated with uncommon and/or sensitive information) to be identified. This improves access to the data stored in the compressed logs. For example, if the uncommon and/or sensitive information included in the log data were compressed in a similar manner as the common or typical information included in the log data, it may be difficult to search for and/or identify the uncommon and/or sensitive information when the logs are compressed (e.g., because there may be no differentiation among the information included in the log data). Therefore, some techniques and implementations described herein enable improved searching of compressed log data, thereby improving access to the data stored in the compressed logs (e.g., without requiring the compressed logs to be decoded and/or decompressed to identify logs that include information matching a search term).

As a result, some techniques and implementations described herein reduce a memory and storage overhead associated with log data. For example, the log data may be compressed into an embedding space, thereby reducing a size of the log data to be stored. Additionally, some techniques and implementations described herein improve security of information included in the log data by enabling a model to recognize and/or compress uncommon and/or sensitive information included in the log data and by ensuring that the compressed logs cannot be decoded and/or decompressed by a generic decoder. Further, some techniques and implementations described herein improve access to data included in compressed log data by enabling improved searching of compressed log data.

FIGS. 1A-1D are diagrams of an example 100 associated with log compression and obfuscation using embeddings. As shown in FIGS. 1A-1D, example 100 includes a log compression device, a secure storage, and a client device. The log compression device may compress and/or store logs generated by the client device. Additionally, or alternatively, the log compression device may enable access to compressed log data to the client device. These devices are described in more detail in connection with FIGS. 2 and 3.

As shown in FIG. 1A, a model (e.g., a compression model) may be trained to efficiently compress log data generated by a device, such as the client device or another source device. In some implementations, the compression model may be neural network model, a variational autoencoder model, a transformer model, and/or a multi-head attention model, among other examples. For example, the compression model may include an encoder (e.g., that receives log data and compresses the log data into an embedding space or encoded space by creating embedding vectors) and a decoder (e.g., that recreates the log data by decoding and decompressing the embedding vectors generated by the encoder). The encoder and the decoder may be neural networks and may be trained to select a best encoding and decoding scheme for log data that results in maintaining the maximum amount of information from the log data when encoding and/or that results in the fewest amount of reconstruction errors when decoding.

For example, as described elsewhere herein, log data may typically include similar information, similar words, and/or similar phrases. For example, log data may use template or boilerplate language for a majority of the information included in the log data. Therefore, the compression model may (e.g., prior to training the compression model for a particular device or a particular application) be a generic model that is capable of compressing log data that includes common information (e.g., information that uses template or boilerplate language in the log data). However, the generic model may be unable to identify and/or compress uncommon information that is included in the log data. "Uncommon information" may refer to information that does not use template or boilerplate language in the log data, sensitive information, personally identifiable information, and/or information that occurs less than a threshold amount (e.g., words, or phrases that are less than a threshold percentage of the total words or phrases included in the log data) in the log data (e.g., information that is present in less than 5%, less than 1%, less than 0.5%, and/or less than 0.1%, among other examples, of the log data), among other examples.

For example, compressing log data using the generic model may result in lossy compression (e.g., in which some information from the log data is not retained through the compression process). Additionally, or alternatively, compressing log data using the generic model may result in the uncommon information not being compressed and/or being lost. Therefore, the generic model may be trained to recognize and/or compress uncommon information in log data. In some implementations, the generic model may be trained to recognize and/or compress uncommon information in log data generated by a particular device (e.g., the log compression device, the client device, and/or another source device). In some implementations, the generic model may be trained to recognize and/or compress uncommon information in log data generated by a particular log creation application (e.g., executing on a device) or a data creation application. For example, the generic model may be a compression model that is capable of compressing log data generated by multiple devices and/or by multiple applications. For example, the generic model may be a compression model that is associated with an entity (e.g., an institution, a company, and/or a business) and is designed to be used for devices and/or applications associated with the entity. In some implementations, a generic model may be associated with a type of log file. For example, a generic model may be associated with PYTHON® log files, website log files, or another type of log file. Starting with a generic compression model (e.g., that may be trained to compress common information associated with a particular device, a particular application, or a particular log file type) may reduce a complexity and an amount of time associated with training the compression model.

As shown by reference number 102, the log compression device may receive and/or obtain a set of training log files. The training log files may be log files or log data previously generated by the device and/or application for which the compression model is being trained to compress log data. As shown by reference number 104, the log compression device may train the compression model (e.g., a neural network model), using the set of training log files (e.g., associated with a device or a log creation application), to generate embeddings for log files associated with the device or the log creation application. For example, training the compression model (e.g., from a generic model to a trained compression model) may enable the compression model to generate embeddings for uncommon information included in the set of training log files, as described in more detail elsewhere herein.

The log compression device may train the compression model by identifying uncommon information included in the set of training log files. Identifying the uncommon information may enable the log compression device to train the compression model to generate one or more embedding vectors for the identified uncommon information. As embedding may be a mapping of a discrete (e.g., categorical) variable to a vector (e.g., an embedding vector) of continuous numbers. For example, embeddings may be low dimensional, learned continuous vector representations of discrete variables. For example, the compression model may generate word embeddings (e.g., that enable words with similar meanings to have a similar representation in an embedding space). For example, word embeddings may enable individual words to be represented as real-valued vectors in a predefined embedding space. Each word or phrase (e.g., a set of words) may be mapped to one embedding vector, and the embedding vector values may be learned in a way that resembles a neural network.

In some implementations, the log compression device may train the compression model by parsing or searching the set of training log files to identify uncommon information included in the set of training log files. For example, the log compression device may use a sensitive information detection technique to search the set of training log files to identify sensitive information and/or personally identifiable information (e.g., usernames, passwords, names, emails, and/or phone numbers) included in the set of log files. In some implementations, the log compression device may parse the set of training log files for phrases or terms that are associated with uncommon information or sensitive information (and/or personally identifiable information) using a dictionary or database that indicates phrases or terms that are associated with uncommon information and/or one or more tags indicating sensitive information (e.g., identifiers indicating sensitive information), among other examples. For example, the log compression device may maintain a dictionary or a database that includes words or phrases that appear less frequently (e.g., less than a threshold frequency, such as 2%, 1%, or 0.5%) in the set of training log files.

In some implementations, the log compression device may identify uncommon information included in the set of training log files using expected or typical information included in the set of training log files. For example, the set of training log files may be expected to include template or boilerplate words, terms, or phrases. The log compression device may parse or search the set of training log files for words, terms, or phrases that do not match the template or boilerplate words, terms, or phrases that are expected to be included in the set of training log files.

In other words, the log compression device may parse the set of training log files to identify a first set of phrases or words included in the training log file and a second set of phrases or words included in the set of training log files, where the first set of phrases includes phrases or words that appear in the set of training log files more frequently (e.g., significantly more frequently) than phrases or words included in the second set of phrases. For example, the first set of phrases or words may include common information included in the set of training log files, and the second set of phrases or words may include uncommon information included in the set of training log files.

For example, as shown by reference number 106, a training log file may include a record or an entry that includes uncommon information. The log compression device may parse or search the training log file to identify the record or entry that includes the uncommon information. For example, as shown in FIG. 1A, the record may be "2021 Apr. 25—Line 735 had an error, Name John Doe is not valid." The uncommon information may be the words or phrase "Name John Doe is not valid." For example, as shown in FIG. 1A, a first portion of the record (e.g., "2021 Apr. 25—Line 735 had an error") may be common information (e.g., template or boilerplate information) included in the log data. As another example, a record that includes uncommon information may be "2021 Apr. 25—Line 210 had an error, Address ABC123@email.com is not valid." The uncommon information may be the words or phrase "Address ABC123@email.com is not valid." For example, the uncommon information may include sensitive information and/or personally identifiable information (e.g., a name in the first example described above or an email address in the second example described above).

Based on identifying uncommon information included in the set of training log files, the log compression device may segment or separate the uncommon information from the common information included in the set of training log files. For example, the log compression device may cluster common information included in the set of training log files and may cluster uncommon information included in the set of training log files. For example, the log compression device may segment or separate the record to separate the uncommon information included in the record from other information included in the record (e.g., to segment or separate "2021 Apr. 25—Line 735 had an error" from "Name John Doe is not valid"). In other words, the log compression device may segment or separate the phrases or terms that are associated with uncommon information or sensitive information from other information included in the set of training log files to enable (e.g., to train) the encoder associated with the compression model to generate embedding vectors for the phrases or terms that are associated with uncommon information or sensitive information, as described in more detail elsewhere herein.

For example, as shown by reference number 108, the log compression device may identify common information (e.g., records that include common information) in training log files included in the set of training log files. The log compression device may train the compression model to create embeddings for the common information. For example, the log compression device may train the compression model to create embeddings for the common information based on a generic model, as described above (e.g., the compression model may be capable of creating embeddings or embedding vectors for the common information without training, as described elsewhere herein).

As shown in FIG. 1A, the log compression device may train the compression model to generate or create embeddings (or embedding vectors) for uncommon information included in the set of training log files. For example, a record in a training log file (e.g., "2021 Apr. 25—Line 735 had an error, Name John Doe is not valid") may include a first phrase or set of words that include common information (e.g., "2021 Apr. 25—Line 735 had an error") and a second phrase or set of words that include uncommon information and/or sensitive information (e.g., "Name John Doe is not valid"). The log compression device may train the compression mode to generate an embedding or an embedding vector for the first phrase or set of words that include common information. The log compression device may train the compression mode to generate an embedding or an embedding vector for the second phrase or set of words that include uncommon information and/or sensitive information. For example, as shown by reference number 110, the log compression device may train the compression model to generate a first embedding vector for the first phrase or set of words that include common information. For example, the log compression device may train the compression model to generate the first embedding vector that represents the phrase "2021 Apr. 25—Line 735 had an error."

In some implementations, as shown in FIG. 1A, the log compression device may segment the second phrase or set of words that include uncommon information and/or sensitive information. For example, the log compression device may segment the second phrase or set of words into a first segment (e.g., "Name"), a second segment (e.g., "John Doe"), and a third segment (e.g., "is not valid"). Segmenting and/or separating the phrase or set of words that include uncommon information and/or sensitive information may enable the log compression device to train the compression model and/or to compress log data in a manner that improves the detection of sensitive information and/or improves an ability of the compressed log data to be searched for uncommon information, as explained in more detail elsewhere herein.

In some implementations, the log compression device may segment the second phrase or set of words based on context information associated with the words included in the second phrase or set of words. For example, the log compression device may segment or separate a descriptor that identifies a type or a category of the uncommon information (e.g., phrases or words such as name, address, email, password, account number, and/or similar words or phrases). The log compression device may segment or separate a content of the uncommon information, such as actual sensitive information or personally identifiable information included in the uncommon information (e.g., to segment or separate an actual name, such as "John Doe," an actual address, an actual email, an actual password, and/or an actual account number). Similarly, the log compression device may segment or separate other information included in the uncommon information, such as "is not valid," among other examples. In some implementations, the log compression device may segment the second phrase or set of words that include uncommon information and/or sensitive information by segmenting and/or separating each word included in the second phrase or set of words. Alternatively, the log compression device may not segment and/or separate phrases and/or sets of words that include uncommon information.

For example, as shown by reference number 112, the log compression device may train the compression model to generate a second embedding or a second embedding vector for a first segment of the uncommon information (e.g., for the word "Name"). As shown by reference number 114, the log compression device may train the compression model to generate a third embedding or a third embedding vector for a second segment of the uncommon information (e.g., for the words "John Doe"). As shown by reference number 116, the log compression device may train the compression model to generate a fourth embedding or a fourth embedding vector for a third segment of the uncommon information (e.g., for the words "is not valid"). In other words, the log compression device may train the compression model (e.g., an encoder of the compression model) to generate the second embedding vector to represent the word "Name." The log compression device may train the compression model (e.g., an encoder of the compression model) to generate the third embedding vector to represent the words "John Doe." Similarly, the log compression device may train the compression model (e.g., an encoder of the compression model) to generate the fourth embedding vector to represent the words "is not valid."

In some implementations, the log compression device may train the compression model to replace sensitive information and/or personally identifiable information included in the set of training log files. For example, the log compression device may train the compression model to replace the uncommon information identified in a record of a training log file with a unique identifier (e.g., a token). For example, the log compression device may train the compression model to replace the uncommon information included in a record of a log file (e.g., "Name John Doe is not valid") with a unique identifier. In some implementations, the log compression device may train the compression model to replace one or more (or all) segments of the uncommon information included in a record of a log file with unique identifiers (e.g., to replace "Name" with a first unique identifier, to replace "John Doe" with a second unique identifier, and/or to replace "is not valid" with a third unique identifier). In some implementations, the log compression device may train the compression model to replace sensitive information and/or personally identifiable information included in the uncommon information with unique identifier(s) (e.g., to replace "John Doe" with a unique identifier, but not to replace "Name" or "is not valid" with unique identifier(s)).

The log compression device may train the compression model to generate embeddings or embedding vectors for the unique identifier(s) that have replaced the uncommon information and/or the sensitive information. In this way, even if the log data is decoded, the decoded log data will include the unique identifiers (e.g., rather than the actual words or phrases included in the uncommon information). This may improve security of the uncommon information and/or the sensitive information included in the log data. Moreover, only replacing sensitive information and/or personally identifiable information included in the uncommon information with unique identifier(s) may enable a context associated with the record in the log file to be maintained while also protecting the security of the sensitive information and/or the personally identifiable information. For example, the decoded record may be "Name [unique identifier] is not valid," enabling a user to identify a context of the record of the log (e.g., that a name provided was not valid) while also protecting the security of the actual name that was originally included in the log data.

In some implementations, the log compression device may train the compression model to (or the log compression device may) perform an encryption of embeddings associated with uncommon information and/or sensitive information. For example, the log compression device may train the compression model to replace uncommon information and/or sensitive information included in the set of training log files with an encrypted key (e.g., in a similar manner as described above in connection with replacing the uncommon information and/or sensitive information included in the set of training log files with a unique identifier). The log compression device may train the compression model to generate an embedding or an embedding vector for the encrypted key (e.g., such that a decoded version of the log data included the encrypted key, rather than the uncommon information and/or sensitive information). Additionally, or alternatively, the log compression device may encrypt (e.g., using an encryption technique), one or more embeddings or embedding vectors that are associated with, or that represent, uncommon information and/or sensitive information. This may improve security of the uncommon information and/or the sensitive information included in the log data by ensuring that only users or devices that are provided with a decryption key (e.g., a private key) are enabled to decrypt and identify the uncommon information and/or the sensitive information included in the log data.

In some implementations, the log compression device may train the compression model to flag or tag embeddings or embedding vectors that are associated with, or that represent, uncommon information and/or sensitive information. For example, the log compression device, when storing compressed log files, may flag or tag embeddings or embedding vectors that are associated with, or that represent, uncommon information and/or sensitive information. This may enable the uncommon information and/or sensitive information to be easily identified (e.g., for improved searching and/or for identifying uncommon information and/or sensitive information that should not have been included in the log data).

The log compression device may store the first embedding vector, the second embedding vector, the third embedding vector, and the fourth embedding vector together when storing a compressed version of the training log file. For example, the log compression device may store the first embedding vector, the second embedding vector, the third embedding vector, and the fourth embedding vector in the same record or entry of a database (e.g., to represent the entire record of the training log file of "2021 Apr. 25—Line 735 had an error, Name John Doe is not valid").

The log compression device may train the compression model using different training log files included in the set of training log files in a similar manner as described above. For example, the log compression device may train an encoder of the compression model to generate embeddings or embedding vectors for information (e.g., common information and uncommon information) included in the training log files. The log compression device may, using a decoder of the compression model, attempt to decode and recreate the training log files. The log compression device may iteratively encode and decode the set of training log files to learn the best encoder and/or decoder for the set of training log files. For example, the log compression device identify the encoder and/or decoder that results in the compression model being capable of encoding and compressing both common information and uncommon information included in the set of training log files and that results in the compression model being capable of decoding the encoded (and compressed) training log files with a satisfactory error rate (e.g., with no error or with a number of errors that satisfies a threshold). For example, the compression model may use an autoencoder technique (e.g., a variational autoencoder technique) to iteratively train the compression model to obtain a trained encoder and decoder that are best suited for the set of training log files (e.g., and therefore the device and/or application associated with the set of training log files).

As shown by reference number 118, the log compression device may store the decoder associated with the trained compression model in a secure storage. For example, the log compression device may store the decoder in a secure location. In some implementations, the secure storage may be associated with a security level, encryptions, and/or password protections to ensure that only authorized users are enabled to access the decoder. In some implementations, the secure storage may be a storage location that is remote from the log compression device and/or a source device that generates log data (such as the client device).

In some implementations, the compression model may be trained by a first device (e.g., the log compression device) and may be deployed on a second device (e.g., a source device and/or the client device). In some implementations, the compression model may be trained by another device (not shown in FIG. 1A) in a similar manner as described above, and the compression model may be deployed on the log compression device. For example, the log compression device may receive and/or obtain the trained compression model and may use the trained compression model to compress and/or obfuscate log data, as described in more detail elsewhere herein.

Figure 1B:
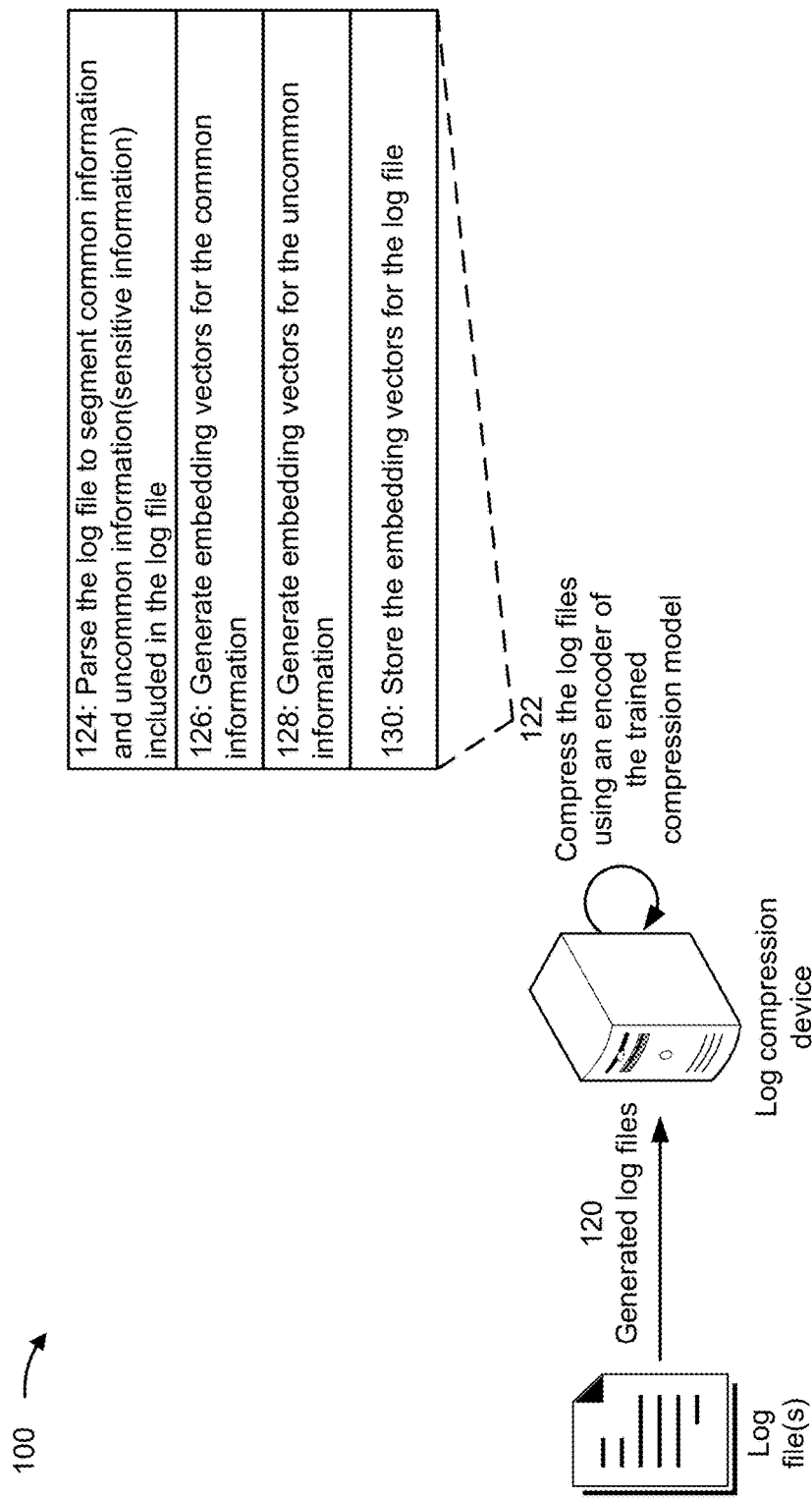

As shown in FIG. 1B, the log compression device may deploy or execute the trained log compression model. For example, the log compression device may use the trained log compression model to compress and/or obfuscate log data generated by an application (e.g., an application for which the compression model was trained on and/or tuned to). For example, as shown by reference number 120, the log compression device may generate log files or log data. In some implementations, the log compression device may receive, from the application executing on the log compression device, a log file associated with the application. In some implementations, another device (e.g., a source device or the client device) may generate log files or the log data and the log compression device may receive or obtain the generated log files or log data.

As shown by reference number 122, the log compression device may compress the log file using an encoder of the trained compression model. For example, the log compression device may compress a log file by creating embeddings or embedding vectors for information included in the log file. For example, the log compression device may generate, using the encoder, a compressed log file including a set of embedding vectors associated with records included in the log file. A compressed log file may be a log file that has a smaller size than the original log file. Additionally, based on generating the embedding vectors, a compressed log file may be obfuscated because the information included in the log file may only be obtained using the decoder associated with the trained compression model.

As shown by reference number 124, the log compression device may generate the compressed log file by parsing the log file to segment common information from uncommon information included in the log file. For example, the log compression device may parse the log file to identify uncommon information and/or sensitive information (e.g., in a similar manner as described elsewhere herein). As shown by reference number 126, the log compression device may generate embedding vectors for the common information included in the log file (e.g., using the encoder).

As shown by reference number 128, the log compression device may generate embedding vectors for the uncommon information and/or the sensitive information included in the log file. For example, for a record in the log file that includes common information and uncommon (or sensitive) information, the log compression device may generate one or more embedding vectors for the uncommon (or sensitive) information and one or more embedding vectors for other information (e.g., the common information) included in the record.

In some implementations, the log compression device may generate multiple embedding vectors for uncommon information included in a record of the log file. In some implementations, the log compression device may generate a first embedding vector for a first segment of the uncommon information and a second embedding vector for a second segment of the uncommon information, where the first segment indicates a category or type associated with the uncommon information and the second segment indicates personally identifiable information or sensitive information included in the uncommon information. For example, if the uncommon information in the record is "Password xyz789," then the log compression device may generate a first embedding vector for a first segment of the uncommon information indicating the type or category (e.g., for the word "Password") and may generate a second embedding vector for a second segment of the uncommon information indicating sensitive information and/or personally identifiable information (e.g., for "xyz789").

In some implementations, the log compression device may replace uncommon information included in the log file with a unique identifier (e.g., a token) or an encryption key (e.g., a public key) prior to generating the embedding vector(s) for the uncommon information (e.g., in a similar manner as described elsewhere herein). In some implementations, the log compression device may encrypt, using an encryption technique, the set of embedding vectors to obtain a set of encrypted embedding vectors for the uncommon information included in the log file. For example, the log compression device may encrypt a set of embedding vectors that are associated with, or that represent, uncommon information and/or sensitive information included in the log file (e.g., to improve a security of the uncommon information and/or the sensitive information included in the log file).

As shown by reference number 130, the log compression device may store the compressed log file. For example, the log compression device may store the embeddings or the embedding vectors for the compressed log file. In some implementations, the log compression device may store embeddings or embedding vectors associated with the same record or the same entry of the log file together. For example, a record may be associated with one or more embedding vectors for uncommon information and one or more embedding vectors for common information. The embedding vectors may be stored together (e.g., in an entry or row of a database) to represent the record of the log file. In some implementations, the log compression device may store embedding vectors that are associated with, or that represent, uncommon information and/or sensitive information with a flag or tag. For example, the flag or the tag may indicate that the embedding vector is associated with, or represents, uncommon information and/or sensitive information. This may enable embedding vectors that are associated with, or that represent, uncommon information and/or sensitive information to be quickly identified (e.g., to identify log files that include uncommon information and/or sensitive information to enable an error that caused the uncommon information and/or sensitive information to be included in the log file to be corrected).

A size of the compressed file may be less than a size of the log file, thereby reducing a storage or memory used to store the log file (e.g., a number of bits associated with the compressed file may be less than a number of bits associated with the log file). Additionally, the embedding vectors obfuscate the records included in the log file because the information included in the log file may be obtained only by using the decoder associated with the trained compression model. This improves a security of the log data by ensuring that only authorized users who have access to the decoder (e.g., to the secure storage) are enabled to decode and decompress the compressed log file to obtain the information included in the log file.

Figure 1C:
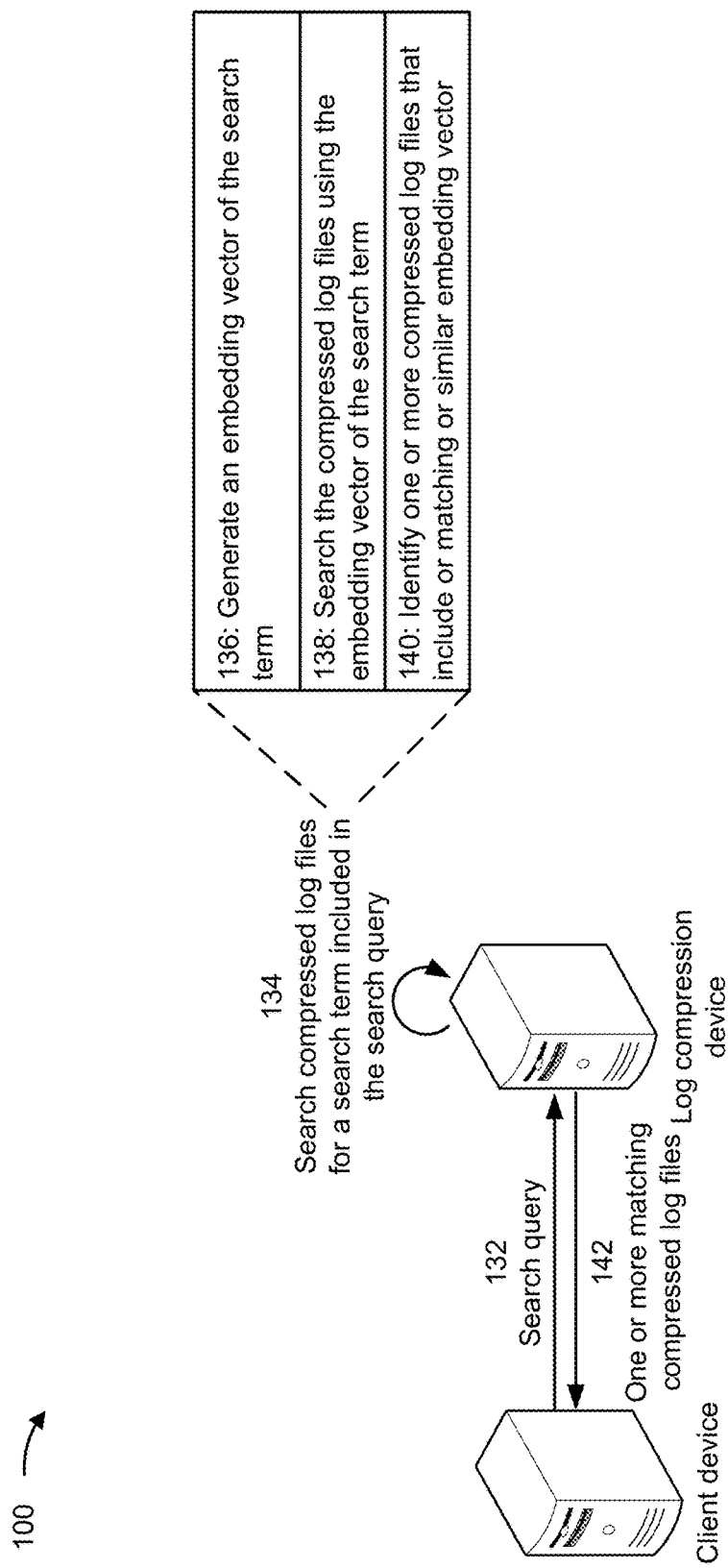

As shown in FIG. 1C, compressing and storing the log file(s) in the manner described herein may enable the compressed log file(s) to be searched for uncommon information and/or sensitive information. For example, as shown by reference number 132, the log compression device may receive, from a client device, a search query. In some implementations, the log compression device may receive the search query from an input to the log compression device (e.g., from a user of the log compression device). The search query may indicate a search term or phrase (e.g., one or more words). For example, the search query may indicate that the log compression device is to search stored compressed log file(s) for log file(s) that include words or phrases matching, or similar to, the search term or phrase. In some implementations, the search term may be associated with sensitive information and/or uncommon information. For example, the search term may be for uncommon information in general (e.g., and the log compression device may search for and return compressed log file(s) that include uncommon information). In some implementations, the search term may be for particular information that is uncommon information. For example, the search term may be "name" (e.g., to search for log file(s) that include the word "name"). As another example, the search term may be a particular name or other personally identifiable information (e.g., to search for log file(s) that include the particular name or other personally identifiable information).

As shown by reference number 134, the log compression device may search stored compressed log files for the search term included in the search query. For example, as shown by reference number 136, the log compression device may generate an embedding vector associated with the search term. For example, the log compression device may use the encoder associated with the trained compression model to generate an embedding or an embedding vector for the search term. As shown by reference number 138, the log compression device may search the compressed log files using the embedding or the embedding vector associated with, or representing, the search term. For example, the log compression device may search a set of stored compressed log files for the embedding vector associated with, or representing, the search term.

As shown by reference number 140, the log compression device may identify one or more compressed log files, from the set of stored log files, that include an embedding vector that matches the embedding vector associated with, or representing, the search term. As shown by reference number 142, the log compression device may return or provide the one or more compressed log files that include an embedding vector that matches the embedding vector associated with, or representing, the search term. For example, the log compression device may transmit, to the client device, the one or more compressed log files.

For example, the search term may be for the word "Name." The log compression device may identify one or more compressed log files that include an embedding or an embedding vector that is associated with, or that represents, the word "Name." As a result, the log compression device may be enabled to provide one or more log files (e.g., in a compressed or decompressed form) that include the word name (e.g., indicating that the log file includes sensitive information or personally identifiable information). In some implementations, as described above, the log compression device may have further obfuscated the information included in the log file by replacing an actual name (e.g., "John Doe") with a unique identifier (e.g., a token) or an encryption key. Therefore, a log file that matches the search term "Name" may return a log file that, when decoded and/or decompressed, includes the word name, but not an actual name. Instead, the actual name may be obfuscated by the unique identifier (e.g., a token) or the encryption key. This may enable improved searching and access to the log data while also ensuring that sensitive information included in the log data is protected and secured.

In some implementations, the search query may be based on a log file. For example, the search query may request that the log compression device identify similar log files to a search log file (e.g., a log file provided via the search request). The log compression device may generate embeddings or embedding vectors for the search log file (e.g., in a similar manner as described above). The log compression device may use the embeddings or embedding vectors for the search log file to search for stored compressed log files that include similar the embeddings or embedding vectors. This may enable the log compression device to identify stored compressed log files that are similar to a search log file provided via a search request.

In this way, the compressed log files may be easily searched for uncommon information and/or sensitive information. For example, the compressed log files may not need to be decompressed and/or decoded to search for uncommon information and/or sensitive information. Because the log compression device may generate separate embedding vectors for uncommon information and/or sensitive information, the log compression device may enable the compressed logs to be searched for embedding vectors that match the embedding vectors that are associated with, or that represent, uncommon information and/or sensitive information. In other words, the log compression device may only need to index the embeddings or the embedding vectors, and the log compression device may not be required to index particular words (e.g., each word) included in the log files. This may reduce a complexity associated with searching the stored (compressed) log files. Moreover, this reduces a memory and storage overhead as an index associated with particular words (e.g., each word) included in the log files does not need to be stored by the log compression device.

For example, a user may be enabled to search compressed log files using the encoder that is stored by, or executing on, a device of the user (e.g., the log compression device or another device that performs similar actions as the log compression device). This may enable the user to easily search and identify compressed log files that match a search term provided by the user. The user may then request that the matching compressed log files be decompressed and/or decoded, as described in more detail elsewhere herein.

Figure 1D:
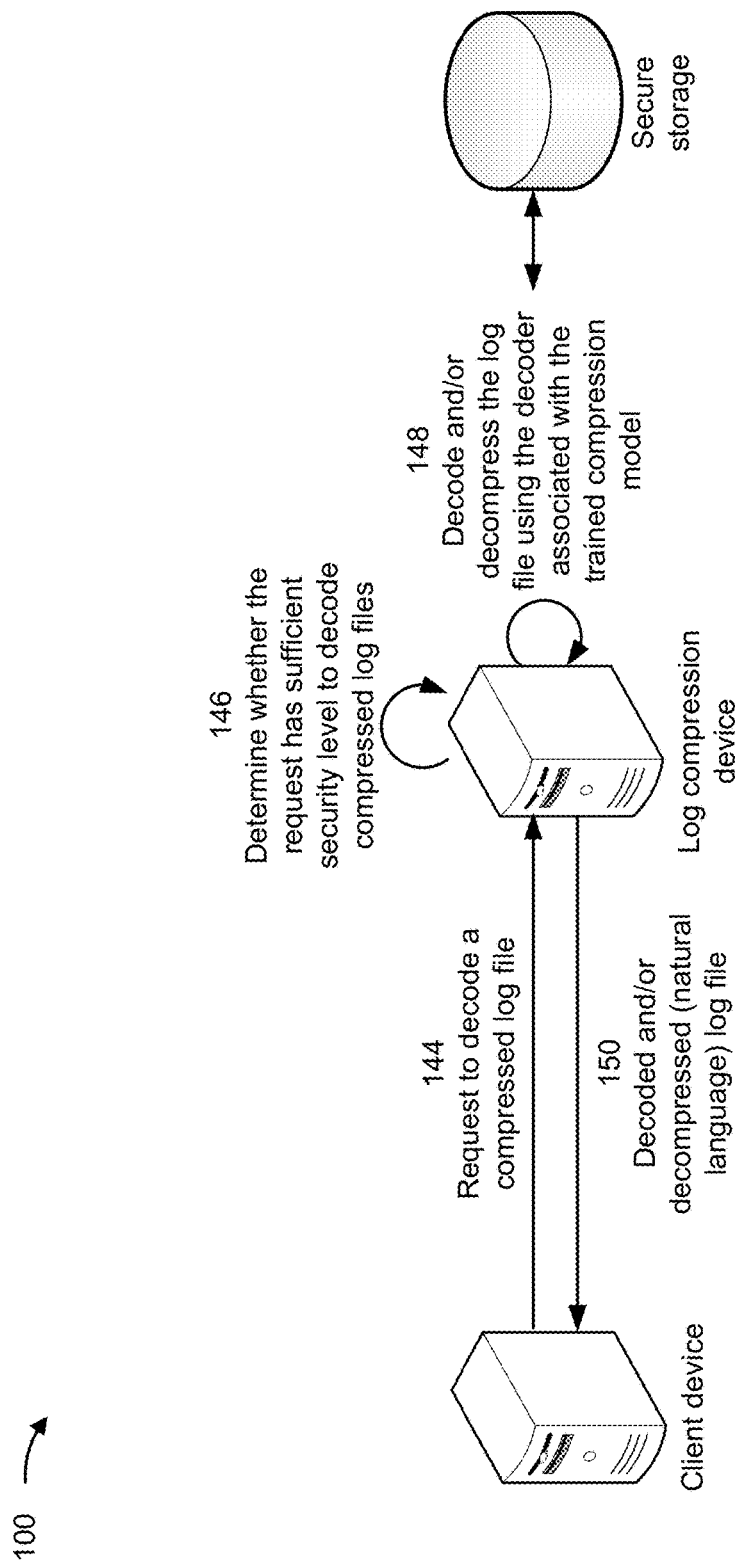

As shown in FIG. 1D, and by reference number 144, the log compression device may receive a request to decode a compressed log file. In some implementations, the log compression device may receive the request to decode a compressed log file from the client device. In some implementations, the log compression device may receive the request to decode a compressed log file via an input to the log compression device. As described elsewhere herein, the decoder associated with the trained compression model may be associated with a higher level of security or protection than the encoder. In other words, a set of users or devices may be enabled to use the encoder to encode and compress log files. However, only a subset of user or devices may be enabled to use the decoder to decode and decompress log files.

In other words, the encoder associated with the compression model may be associated with a first security level, and the decoder associated with the model may be associated with a second security level (e.g., that is higher than, or more restrictive than, the first security level). For example, the decoder may be stored in a separate location (e.g., in the secure storage) or in a separate layer (e.g., a separate application programming interface (API) layer) that is associated with different security requirements than a location or a layer associated with the encoder.

As shown by reference number 146, the log compression device may determine whether the request has a sufficient security level to decode compressed log files. For example, the log compression device may determine a security level associated with the request (e.g., a security level of a user associated with the request or a security level of the client device). The log compression device may determine if the security level associated with the request satisfies the security level or security condition associated with the decoder. For example, the request may be associated with a user identifier. The log compression device may determine if the user identifier is included in a list of user identifiers that are associated with users who are authorized to access and/or use the decoder.

As shown by reference number 148, the log compression device may decode and/or decompress the log file using the decoder associated with the trained compression model. For example, if the request is associated with a security level that satisfies the security level or security condition associated with the decoder, then the log compression device may use the decoder to recreate the information included in the log file. For example, the log compression device may transmit or provide, to the decoder (e.g., to the API layer or the secure storage where the decoder is stored or is being executed), one or more compressed log files to obtain the records associated with the one or more compressed log files.

For example, the decoder may be trained to decode and decompress the embedding vectors associated with the one or more compressed log files. The decoder may recreate the actual information (e.g., raw text and/or natural language information) that was included in the original log file from the embeddings and/or embedding vectors associated with the compressed log file. In some implementations, the log compression device may receive or obtain, from the decoder, decoded and decompressed records associated with the one or more compressed log files. In some implementations, the decoder may be stored locally by the log compression device. In some other implementations, the decoder may be stored in a location that is remote from the log compression device (e.g., to improve security and reduce access to the decoder).

As shown by reference number 150, the log compression device may transmit, to the client device, the decoded and/or decompressed log file based on decoding and/or decompressing the compressed log file using the decoder. In some implementations, the log compression device may provide or store the decoded and/or decompressed log file locally (e.g., where a request for the decoded and/or decompressed log file originated at the log compression device). In some implementations, the decoded and/or decompressed log file may include obfuscated information (e.g., for sensitive information included in the log file). For example, the decoded and/or decompressed log file may include a unique identifier or an encryption key for sensitive information included in the log file. Therefore, additional steps may be required for a user to obtain the actual sensitive information included in the log file. This may improve a security of the sensitive information included in the log file as a malicious actor may be required to obtain both the decoder and a means for understanding the unique identifier or the encryption key to obtain the actual sensitive information included in the log file.

As indicated above, FIGS. 1A-1D are provided as an example. Other examples may differ from what is described with regard to FIGS. 1A-1D.

Figure 2:
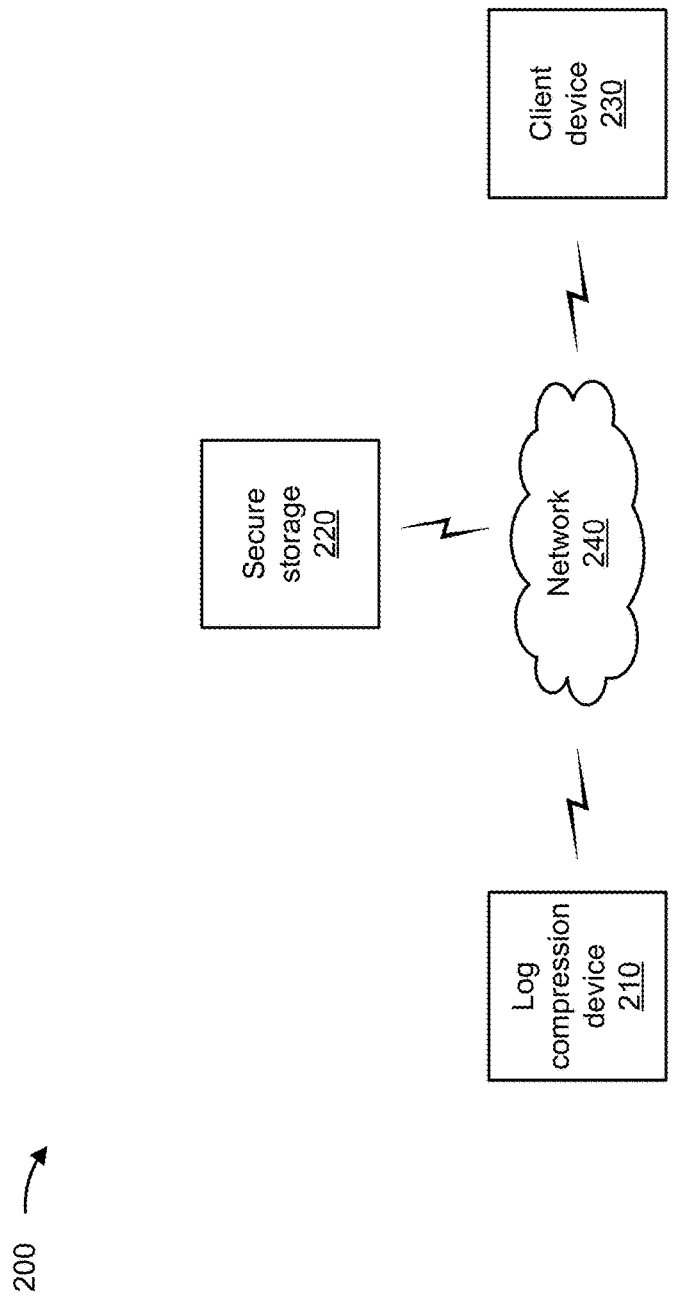
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a log compression device 210, a secure storage 220, a client device 230, and a network 240. Devices of environment 200 may interconnect via wired connections, wireless connections, or a combination of wired and wireless connections.

The log compression device 210 includes one or more devices capable of receiving, generating, storing, processing, providing, and/or routing information associated with log compression and obfuscation using embeddings, as described elsewhere herein. The log compression device 210 may include a communication device and/or a computing device. For example, the log compression device 210 may include a server, such as an application server, a client server, a web server, a database server, a host server, a proxy server, a virtual server (e.g., executing on computing hardware), or a server in a cloud computing system. In some implementations, the log compression device 210 includes computing hardware used in a cloud computing environment.

The secure storage 220 includes one or more devices capable of receiving, generating, storing, processing, and/or providing information associated with log compression and obfuscation using embeddings, as described elsewhere herein. The secure storage 220 may include a communication device and/or a computing device. For example, the secure storage 220 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The secure storage 220 may communicate with one or more other devices of environment 200, as described elsewhere herein.

The client device 230 includes one or more devices capable of receiving, generating, storing, processing, and/or providing information associated with log compression and obfuscation using embeddings, as described elsewhere herein. The client device 230 may include a communication device and/or a computing device. For example, the client device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 240 includes one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
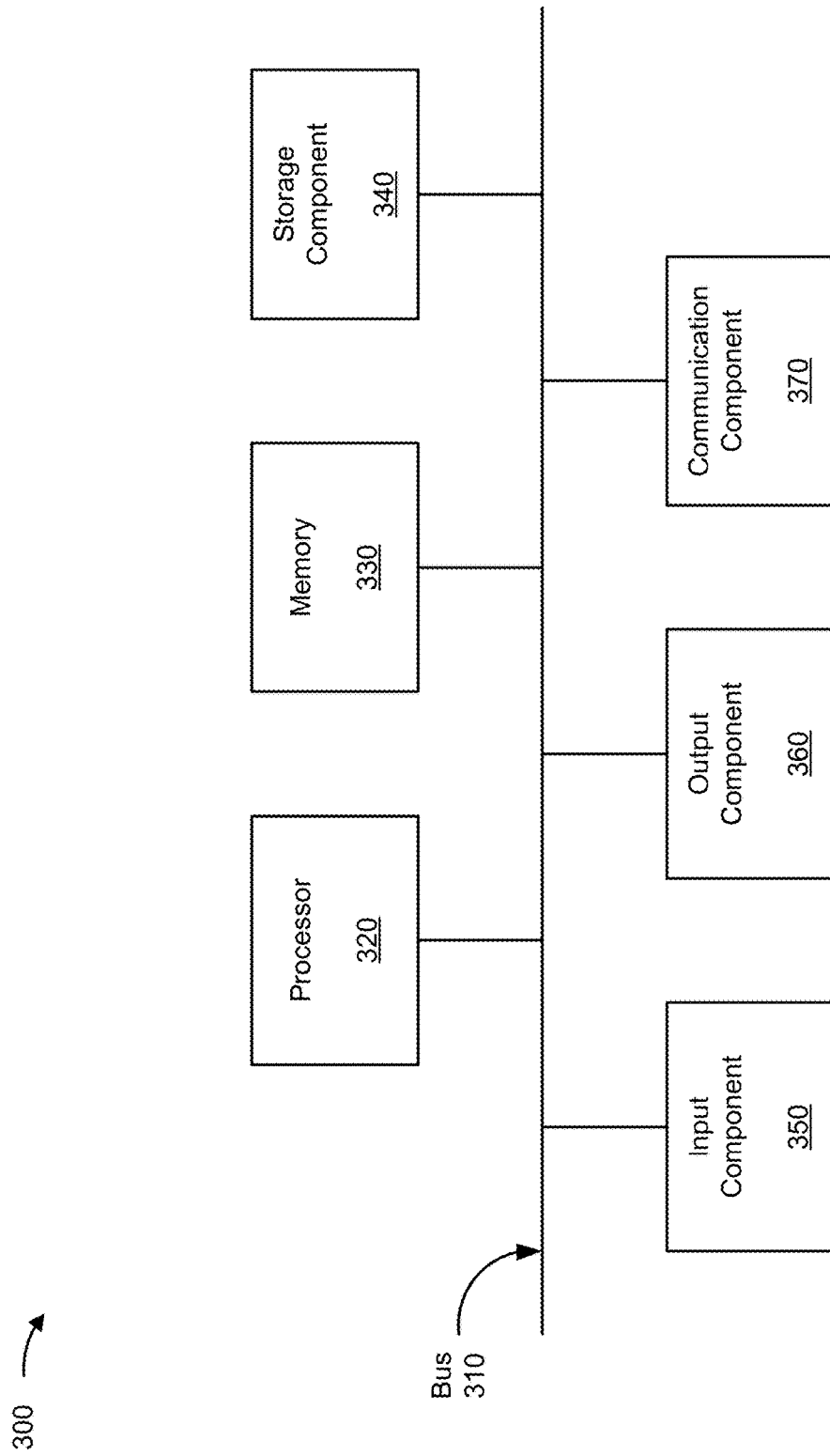
FIG. 3 is a diagram of example components of one or more devices of FIG. 2.

FIG. 3 is a diagram of example components of a device 300, which may correspond to the log compression device 210, the secure storage 220, and/or the client device 230. In some implementations, the log compression device 210, the secure storage 220, and/or the client device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
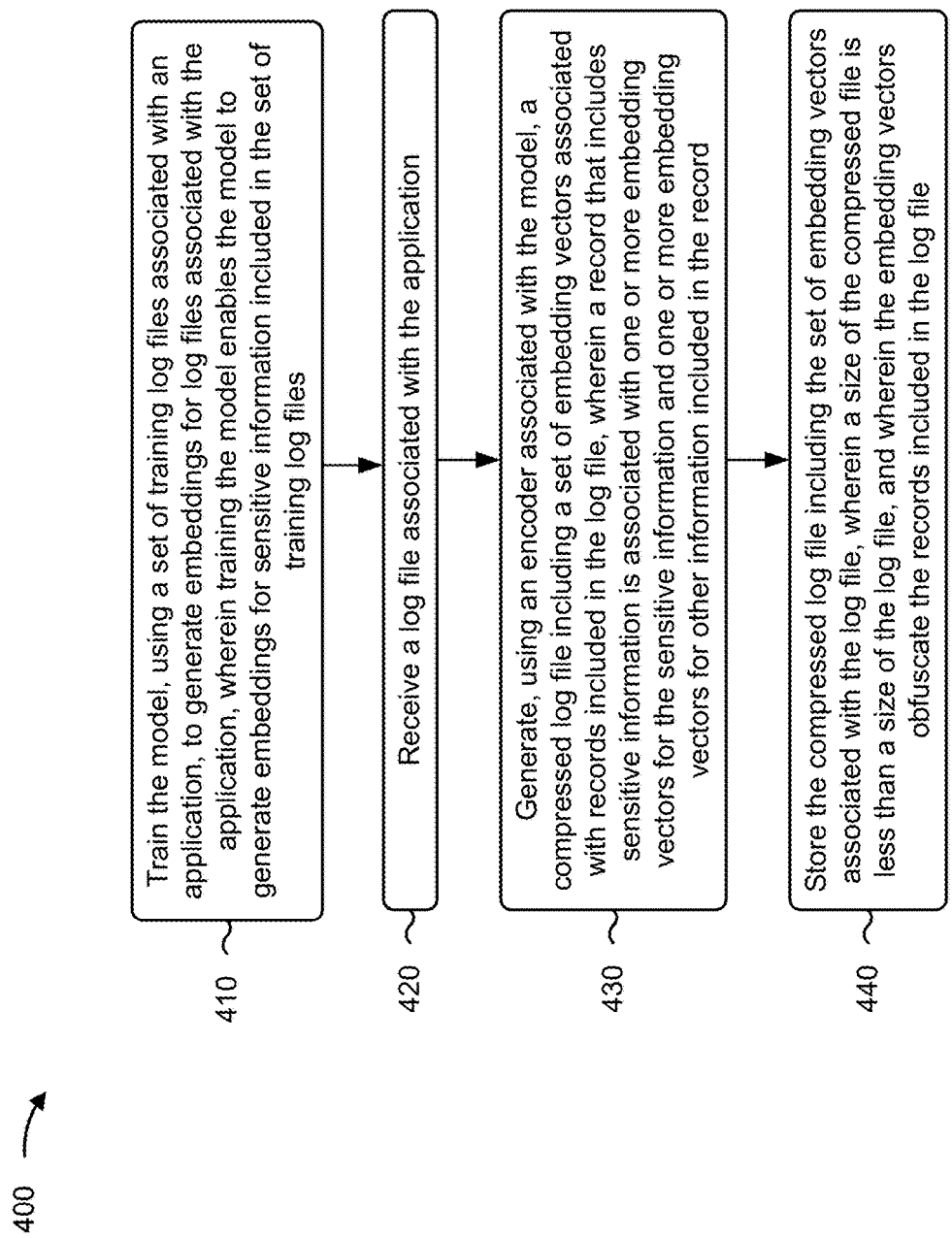
FIG. 4 is a flowchart of an example process relating to log compression and obfuscation using embeddings.

FIG. 4 is a flowchart of an example process 400 associated with log compression and obfuscation using embeddings. In some implementations, one or more process blocks of FIG. 4 may be performed by a device (e.g., the log compression device 210). In some implementations, one or more process blocks of FIG. 4 may be performed by another device or a group of devices separate from or including the device, such as the secure storage 220 and/or the client device 230, among other examples. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include training the model, using a set of training log files associated with an application, to generate embeddings for log files associated with the application (block 410). In some implementations, training the model enables the model to generate embeddings for sensitive information included in the set of training log files. As further shown in FIG. 4, process 400 may include receiving a log file associated with the application (block 420). As further shown in FIG. 4, process 400 may include generating a compressed log file including a set of embedding vectors associated with records included in the log file (block 430). In some implementations, a record that includes sensitive information is associated with one or more embedding vectors for the sensitive information and one or more embedding vectors for other information included in the record. As further shown in FIG. 4, process 400 may include storing the compressed log file including the set of embedding vectors associated with the log file (block 440). In some implementations, a size of the compressed file is less than a size of the log file, and the embedding vectors obfuscate the records included in the log file.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Accordingly, the scope of the invention should be determined not by the embodiments illustrated, but by the appended claims and their equivalents.

What is claimed is:

1. A system for compressing and obfuscating log files using a neural network model to generate embeddings for the log files, the system comprising:
   one or more memories; and
   one or more processors, coupled to the one or more memories, configured to:
      train the neural network model, using a set of training log files associated with a log creation application, to generate embeddings for log files associated with the log creation application,
         wherein training the neural network model enables the neural network model to generate embeddings for uncommon information included in the set of training log files, and
         wherein the uncommon information comprises information that comprises less than a threshold percentage of a total amount of information included in the set of training log files;
      receive, by an encoder associated with the neural network model, a log file associated with the log creation application;
      generate, by the encoder, a compressed log file including a set of embedding vectors associated with records included in the log file,
         wherein a record that includes uncommon information is associated with one or more embedding vectors for the uncommon information and one or more embedding vectors for other information included in the record; and
      store the compressed log file including the set of embedding vectors associated with the log file,
         wherein a size of the compressed log file is less than a size of the log file, and
         wherein the embedding vectors obfuscate the records included in the log file.

2. The system of claim 1, wherein the one or more processors are further configured to:
   receive a search query indicating a search term associated with uncommon information;
   generate an embedding vector associated with the search term;
   search a set of stored compressed log files, including the compressed log file, for the embedding vector associated with the search term; and
   identify one or more compressed log files, from the set of stored compressed log files, that include an embedding vector that matches the embedding vector associated with the search term.

3. The system of claim 2, wherein the one or more processors are further configured to:
   transmit, to a decoder associated with the neural network model, the one or more compressed log files to obtain records associated with the one or more compressed log files, wherein the decoder enables the system to decode and decompress embedding vectors associated with the one or more compressed log files, and wherein the decoder is stored in a secure location or a separate layer from the encoder; and receive, from the decoder, decoded and decompressed records associated with the one or more compressed log files.

4. The system of claim 1, wherein the one or more processors, to train the neural network model to generate embeddings for log files associated with the log creation application, are configured to:

identify uncommon information included in a record of a training log file included in the set of training log files associated with the log creation application;

segment the record to separate the uncommon information included in the record from other information included in the record;

generate one or more embedding vectors for the uncommon information included in the record and another embedding vector for the other information included in the record; and store the one or more embedding vectors and the other embedding vector in a same entry associated with the record.

5. The system of claim 4, wherein the one or more processors, to generate the one or more embedding vectors for the uncommon information included in the record, are configured to:

generate a first embedding vector for a first segment of the uncommon information and a second embedding vector for a second segment of the uncommon information, wherein the first segment indicates a category or type associated with the uncommon information and the second segment indicates personally identifiable information associated with the uncommon information.

6. The system of claim 4, wherein the one or more processors, to identify uncommon information included in the record, are configured to:

parse the training log file for phrases or terms that are associated with uncommon information or sensitive information using at least one of a dictionary that indicates at least one of a set of phrases that are associated with uncommon information or a set of terms that are associated with uncommon information or one or more tags indicating sensitive information; and segment the phrases or the terms that are associated with the uncommon information or the sensitive information from other information included in the training log file to enable the encoder to generate embedding vectors for the phrases or the terms that are associated with the uncommon information or the sensitive information.

7. The system of claim 1, wherein the one or more processors, to train the neural network model to generate embeddings for log files associated with the log creation application, are configured to:

identify uncommon information included in a record of a training log file included in the set of training log files associated with the log creation application;

replace the uncommon information in the record with one or more unique identifiers; and generate one or more embedding vectors for the one or more unique identifiers included in the record and another embedding vector for the other information included in the record.

8. The system of claim 1, wherein the one or more processors are further configured to:

receive a request to decode or decompress the compressed log file;

determine a security level associated with the request; and decode, using a decoder associated with the neural network model, the compressed log file to obtain records associated with a log file corresponding to the compressed log file if the security level associated with the request satisfies a security condition associated with the decoder.

9. A method for compressing and obfuscating log files using a model to generate embeddings for the log files, comprising:

training, by a device, the model, using a set of training log files associated with an application, to generate embeddings for log files associated with the application, wherein training the model enables the model to generate embeddings for uncommon information included in the set of training log files,
wherein the uncommon information comprises information that comprises less than a threshold percentage of a total amount of information included in the set of training log files;

receiving, by the device, a log file associated with the application;

generating, by the device using an encoder associated with the model, a compressed log file including a set of embedding vectors associated with records included in the log file, wherein a record that includes uncommon information is associated with one or more embedding vectors for the uncommon information and one or more embedding vectors for other information included in the record; and storing, by the device, the compressed log file including the set of embedding vectors associated with the log file, wherein a size of the compressed log file is less than a size of the log file, and wherein the embedding vectors obfuscate the records included in the log file.

10. The method of claim 9, further comprising:

receiving a search query indicating a search term associated with sensitive information;

generating an embedding vector associated with the search term;

searching a set of stored compressed log files, including the compressed log file, for the embedding vector associated with the search term; and identifying one or more compressed log files, from the set of stored log files, that include an embedding vector that matches the embedding vector associated with the search term.

11. The method of claim 9, wherein training the model comprises:

parsing a training log file included in the set of training log files associated with the application to identify a first set of phrases included in the training log file and a second set of phrases included in the training log file, wherein the first set of phrases includes phrases that appear in the set of training log files more frequently than phrases included in the second set of phrases;

training the model to generate embedding vectors for the phrases included in the first set of phrases; and training the model to generate embedding vectors for the phrases included in the second set of phrases.

12. The method of claim 9, wherein training the model comprises:

identifying uncommon information included in a record of a training log file included in the set of training log files associated with the application;

replacing the uncommon information in the record with one or more unique identifiers; and generating one or more embedding vectors for the one or more unique identifiers included in the record and another embedding vector for the other information included in the record.

13. The method of claim 9, further comprising:

identifying a set of embedding vectors for uncommon information included in the log file; and encrypting, using an encryption technique, the set of embedding vectors to obtain a set of encrypted embedding vectors for the uncommon information included in the log file.

14. The method of claim 9, wherein the encoder associated with the model is associated with a first security level and a decoder associated with the model is associated with a second security level.

15. The method of claim 9, wherein the model is at least one of a variational autoencoder model, a transformer model, or a multi-head attention model.

16. A non-transitory computer-readable medium storing a set of instructions, the set of instructions comprising:

one or more instructions that, when executed by one or more processors of a system, cause the system to:

train a neural network model, using a set of training log files associated with a log creation application, to generate embeddings for log files associated with the log creation application, wherein training the neural network model enables the neural network model to generate embeddings for uncommon information included in the set of training log files, wherein the uncommon information comprises information that comprises less than a threshold percentage of a total amount of information included in the set of training log files;

receive a log file associated with the log creation application;

generate, using an encoder associated with the neural network model, a compressed log file including a set of embedding vectors associated with records included in the log file, wherein a record that includes uncommon information is associated with one or more embedding vectors for the uncommon information and one or more embedding vectors for other information included in the record; and store the compressed log file including the set of embedding vectors associated with the log file.

17. The non-transitory computer-readable medium of claim 16, wherein the one or more instructions further cause the system to:

receive a search query indicating a search term associated with uncommon information;

generate an embedding vector associated with the search term;

search a set of stored compressed log files, including the compressed log file, for the embedding vector associated with the search term; and identify one or more compressed log files, from the set of stored compressed log files, that include an embedding vector that matches the embedding vector associated with the search term.

18. The non-transitory computer-readable medium of claim 16, wherein the one or more instructions, that cause the system to train the neural network model, cause the system to:

identify uncommon information included in a record of a training log file included in the set of training log files associated with the log creation application;

segment the record to separate the uncommon information included in the record from other information included in the record;

generate one or more embedding vectors for the uncommon information included in the record and another embedding vector for the other information included in the record; and store the one or more embedding vectors and the other embedding vector in a same entry associated with the record.

19. The non-transitory computer-readable medium of claim 18, wherein the one or more instructions, that cause the system to generate the one or more embedding vectors for the uncommon information included in the record, cause the system to:

generate a first embedding vector for a first segment of the uncommon information and a second embedding vector for a second segment of the uncommon information, wherein the first segment indicates a category or type associated with the uncommon information and the second segment indicates personally identifiable information associated with the uncommon information.

20. The non-transitory computer-readable medium of claim 18, wherein the one or more instructions, that cause the system to identify uncommon information included in the record, cause the system to:

search the training log file for phrases or terms that are associated with the uncommon information or sensitive information using at least one of a dictionary that indicates one or more of a set of phrases that are associated with the uncommon information or a set of terms that are associated with the uncommon information or one or more identifiers indicating sensitive information; and separate the phrases or the terms that are associated with the uncommon information or the sensitive information from other information included in the training log file to enable the encoder to generate embedding vectors for the phrases or the terms that are associated with the uncommon information or the sensitive information.

* * * * *